J. F. BROWN & A. HUMPHREYS.
VEHICLE SPRING.
APPLICATION FILED JULY 31, 1916.
1,222,066.
Patented Apr. 10, 1917.
2 SHEETS—SHEET 1.
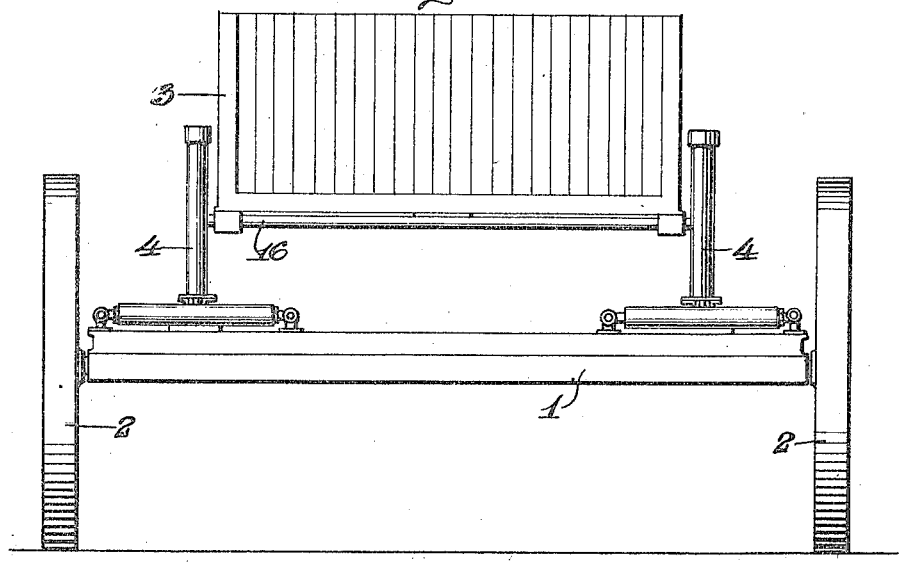
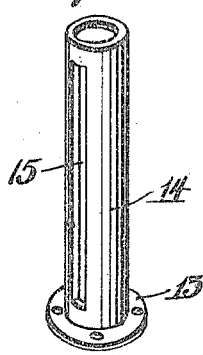
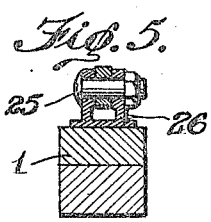
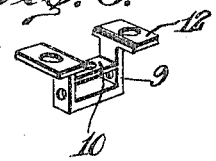
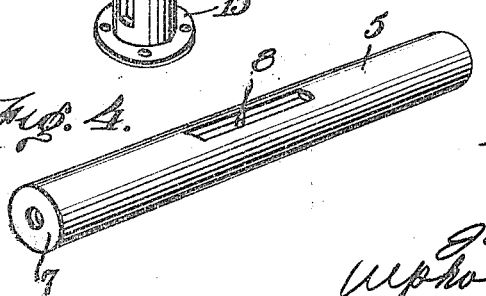
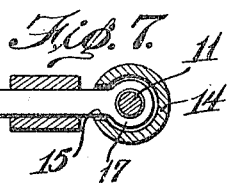
INVENTORS
BY
ATTORNEY

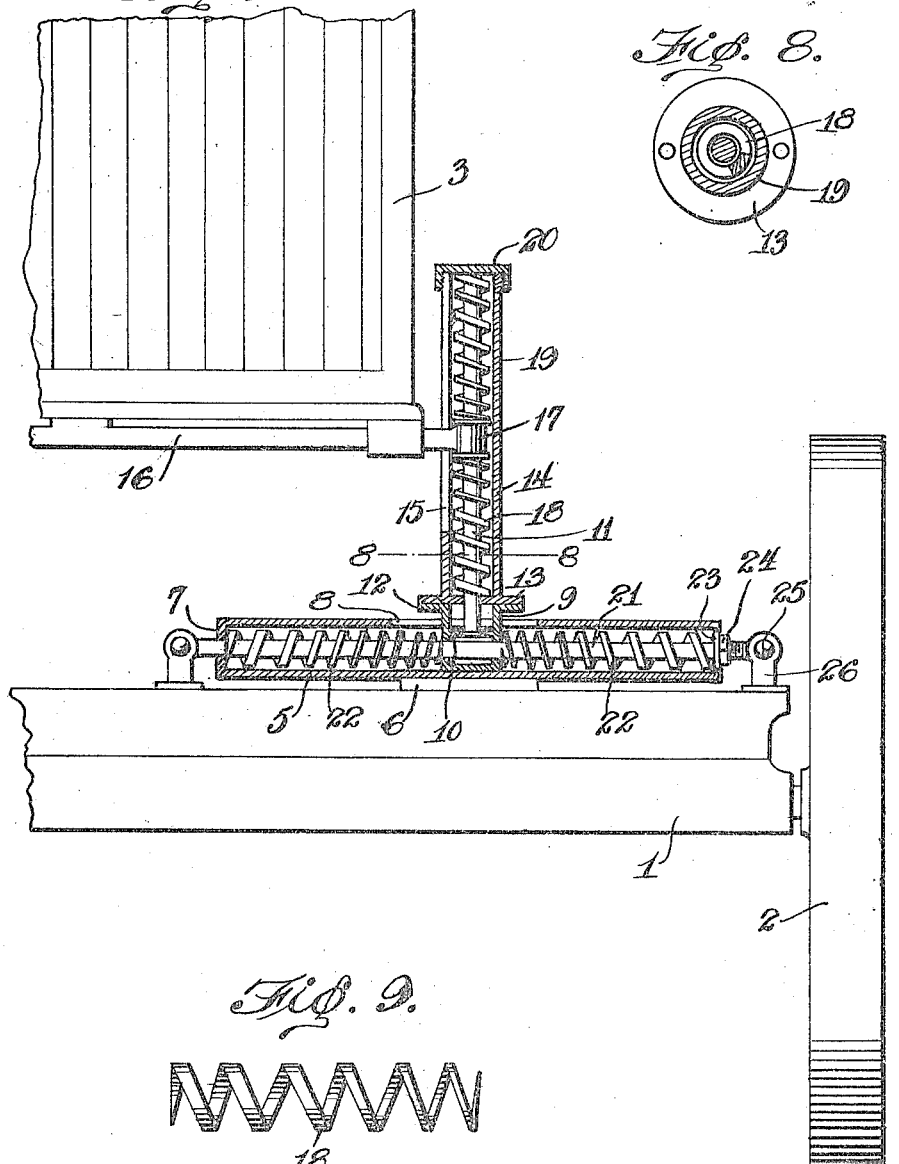

UNITED STATES PATENT OFFICE.

JOHN F. BROWN AND ALPHONSO HUMPHREYS, OF CASA GRANDE, ARIZONA.

VEHICLE-SPRING.

1,222,066.     Specification of Letters Patent.     Patented Apr. 10, 1917.

Application filed July 31, 1916. Serial No. 112,327.

*To all whom it may concern:*

Be it known that we, JOHN F. BROWN and ALPHONSO HUMPHREYS, citizens of the United States, residing at Casa Grande, in the county of Pinal and State of Arizona, have invented certain new and useful Improvements in Vehicle-Springs, of which the following is a specification.

This invention relates broadly to vehicles and more particularly to a spring therefor.

As a primary object, this invention contemplates the provision of novel means for absorbing the shocks transmitted to the body of a vehicle especially when traveling over rough and uneven roads, thereby reducing the vibration to a minimum, rendering the occupants more comfortable, and, incidentally increasing the longevity of the vehicle.

It is another object of the invention to provide a plurality of sets of vertically superposed springs arranged in order that the vehicle body may be supported therebetween whereby the lower of the springs will resiliently support the vehicle body and absorb downward jolts while the upper springs will absorb upward jolts, thus being in effect non-synchronizing.

As a further object it is also contemplated by this invention to provide resilient means coöperating with the vertically arranged springs for absorbing practically all lateral shocks and jars to which the vehicle body may be subjected when in use.

It is a more specific object of this invention to provide rods for supporting the springs as well as casings for inclosing the springs and rods, one of the casings of each set being slidably arranged in the other thereof to allow the springs in the latter to operate; to provide means for adjusting the tension of the springs; and to improve the construction of the springs so as to increase the efficiency of the device in general.

Other objects, as well as the nature, characteristic features, and scope of this invention will be understood from the following description taken in connection with the accompanying drawings and pointed out in the claims.

In the drawings:

Figure 1 is a rear elevation of a vehicle showing this invention applied thereto.

Fig. 2 is an enlarged rear elevation of a vehicle, this invention being shown in section.

Fig. 3 is a perspective of one of the vertical casings.

Fig. 4 is a perspective of one of the horizontal casings.

Fig. 5 is a sectional detail showing the means for mounting one of the horizontal rods.

Fig. 6 is a perspective of the element for slidably connecting the casings.

Fig. 7 is an enlarged detail showing the body supporting bar in a vertical casing.

Fig. 8 is an enlarged transverse section taken on line 8—8 of Fig. 2; and

Fig. 9 is an enlarged elevation of one of the springs illustrating to advantage the tapering construction thereof.

Referring more particularly to the drawings in which similar reference numerals designate like and corresponding parts throughout the several views, we have illustrated a vehicle, but it may be understood that the particular construction thereof forms no essential part of the invention, being merely shown in order to clearly and accurately set forth the invention. This vehicle consists of an axle 1 on which is rotatably mounted supporting wheels 2, the body 3 being yieldably supported through the medium of my improved springs designated in its entirety by the numeral 4.

In the present instance the preferred form of the vehicle spring consists of a plurality of horizontal casings 5 each supported adjacent the respective ends of the axle 1 by means of a block 6.

Adjacent ends of the casings 5 are closed as indicated by the numeral 7 while a slot 8 is provided in the upper surface intermediate the ends thereof so as to slidably receive and support a U-shaped connecting element 9.

Each of these elements has a transverse piece 10 integral with the sides thereof in which is mounted a vertical rod 11 while flanges 12 project from the sides for supporting the base 13 of each of the vertically arranged casings 14.

As is apparent the base of each casing is provided with an opening so as to allow one of the rods 11 to pass therethrough and be arranged in the casing. The vertical casings are further provided with vertical slots 15 and as is apparent these slots 15 are arranged opposite to each other so as to slidably receive the respective ends of a transverse vehicle body supporting bar 16. The respective ends of the bar 16 terminate in loops 17 which are incidentally slidably arranged about the rods 11. Preparatory to arranging the bar 16 in position compressed helical springs 18 are disposed about the rods, the respective ends bearing against the bases 13 and against washers which in turn abut the loops 17. The piece from which each of these springs 18 is formed is approximately square in cross section and before being placed in its helical form is a tapered strip. As it appears in Fig. 2, the enlarged end of the spring is arranged adjacent the base 13 while the small or thin end is arranged adjacent the loop 17. Another spring 19 similar in construction to the spring 18 is arranged within each casing 11 so that the thin end bears against a washer which in turn abuts the loop 17. The adjusting element 20 is now mounted in the upper end of each casing and on each rod 11 so as to regulate the compression of the springs 18 and 19. In use the lower springs 18 absorb the downward jolt while the upper springs 19 absorb the upward jolt and because of their non-synchronizing action efficiently support the body 3 and reduce the vibration thereof to a minimum.

In order to absorb practically all of the lateral shocks imposed on the vehicle body we have provided another rod 21 and arranged the same in the horizontal casing 5, said rod passing through alining openings in the sides of the U-shaped connecting element 9. Helical springs 22 similar in construction to the springs 18 and 19 are now arranged in the horizontal casing 5, the thin ends being positioned against the sides of the U-shaped connecting element 9 as will be apparent upon reference to Fig. 2 of the drawings. The inner ends of the horizontal casings 5 are preferably closed as at 7 but constructed to receive one end of the rod 21. The outer ends of the rods 21 are threaded and have washers 23 disposed thereabout which are held against the enlarged end of the adjacent spring through the medium of adjusting nuts 24. The respective ends of the rods 21 are reduced and pivotally and removably mounted by means of nut bolt arrangement 25 between the bifurcated ends of brackets 26 carried by the axle 1. Whenever the lateral shock is transmitted to the vehicle body the connecting elements 9 will slide in the slots 8 against the tension of either of the springs 22 and since they also have non-synchronizing action the vibration is reduced to a minimum.

In view of the foregoing it is thought that a detailed description of the operation of the invention is unnecessary. However, at this point, it may be mentioned that it is desired that the springs, rods and casings be constructed and arranged in the most compact form possible, and likewise, the casings are practically dustproof so that oil may be kept therein to consequently increase the efficiency of the device.

Although we have shown and described the preferred form of our invention we desire it to be understood that we are not to be limited to the exact details shown, but we desire that great stress be laid upon the construction of the springs and their peculiar arrangement in the casings. Attention is also directed to the arrangement of coöperation existing between the vertical and lateral absorbing resilient means.

From the above description taken in connection with the accompanying drawings it can be easily seen that we have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of the invention and that various minor changes in detail of construction, proportion and arrangement of the parts may be made within the scope of the appended claims without sacrificing any of the advantages of our invention.

Having then fully described our invention what we claim as new and desire to secure by Letters Patent, is:

1. In a vehicle spring, the combination with an axle and a vehicle body, of a cross bar for supporting one end of the body, casings arranged horizontally at the extremities of the axle, vertical casings slidably mounted in the horizontal casings and arranged to slidably receive the ends of the bar, resilient means arranged to the vertical casings and positioned above and below the bar for absorbing shocks transmitted thereto, and other resilient means mounted adjacent the respective extremities of the horizontal casings for coöperating with the vertical casings for absorbing lateral shocks.

2. In a vehicle spring the combination with the axles and the body of the vehicle, of cross bars for supporting the body, horizontally arranged casings mounted adjacent the respective extremities of the axles and each provided with a slot, vertically arranged casings having slots therein for slidably receiving the ends of the bar, connecting elements one of which is connected to the bottom of a vertical casing and slidably mounted in a horizontal casing, rods anchored in the elements and positioned in the vertical casings for also slidably receiving ends of the bar, springs mounted in the vertical casings and arranged above and below the ends of the bar for absorbing vertical jolts transmitted thereto, means for regulating the compression of the springs, other rods arranged in the horizontal casings and mounted on the axles, other springs arranged in the horizontal casings and positioned upon opposite connecting elements for absorbing lateral shocks, and means for regulating the compression of the horizontally arranged springs.

3. In a vehicle spring the combination with the axles and body of a vehicle, of supporting means for the body, vertically arranged casings for slidably receiving the ends of the supporting means, non-synchronizing resilient means in the casings for absorbing shocks for reducing vibration of the body to a minimum; horizontally arranged casings mounted adjacent the extremities of the axles for slidably mounting the vertical casings, and resilient means arranged in the horizontal casings and having a non-synchronizing action on the vertical casings for absorbing lateral shocks imposed on the vehicle body.

In testimony whereof, we hereby affix our signatures.

JOHN F. BROWN.
ALPHONSO HUMPHREYS.